(12) United States Patent
Bennett

(10) Patent No.: US 7,126,781 B1
(45) Date of Patent: Oct. 24, 2006

(54) DISK DRIVE EMPLOYING A MULTI-STAGE PULSE WIDTH MODULATED VOICE COIL MOTOR DRIVER

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 62 days.

(21) Appl. No.: 10/377,038

(22) Filed: Feb. 28, 2003

(51) Int. Cl.
*G11B 21/02* (2006.01)
*G11B 5/596* (2006.01)

(52) U.S. Cl. ..................... 360/75; 360/78.04
(58) Field of Classification Search ............... 360/75, 360/77.02, 78.04, 78.12; 318/256, 280, 293, 318/560, 686
See application file for complete search history.

(56) References Cited

U.S. PATENT DOCUMENTS

| | | | | |
|---|---|---|---|---|
| 5,781,362 A | * | 7/1998 | Bang | ............... 360/78.05 |
| 5,818,178 A | * | 10/1998 | Marumoto et al. | ............... 318/254 |
| 5,838,515 A | * | 11/1998 | Mortazavi et al. | ............... 360/78.12 |
| 6,023,143 A | * | 2/2000 | Salina et al. | ............... 318/599 |
| 6,084,378 A | | 7/2000 | Carobolante | |
| 6,850,383 B1 | * | 2/2005 | Bennett | ............... 360/75 |

OTHER PUBLICATIONS

U.S. Appl. No. 10/028,954, filed Dec. 10, 2001, entitled "Digital Amplifier with Improved Performance".

* cited by examiner

*Primary Examiner*—Wayne Young
*Assistant Examiner*—Jason Olson
(74) *Attorney, Agent, or Firm*—Howard H. Sheerin, Esq.

(57) ABSTRACT

A disk drive is disclosed comprising a disk and a voice coil motor (VCM) having a voice coil for actuating a head over the disk. A VCM driver comprises an H-bridge driver having a plurality of driver switches for driving current through the voice coil to ground. A first pulse width modulated (PWM) signal controls a first voltage level driving the voice coil relative to a duty cycle of the first PWM signal, and a second PWM signal controls a second voltage level driving the voice coil relative to a duty cycle of the second PWM signal, wherein the first voltage level is greater than the second voltage level.

15 Claims, 11 Drawing Sheets

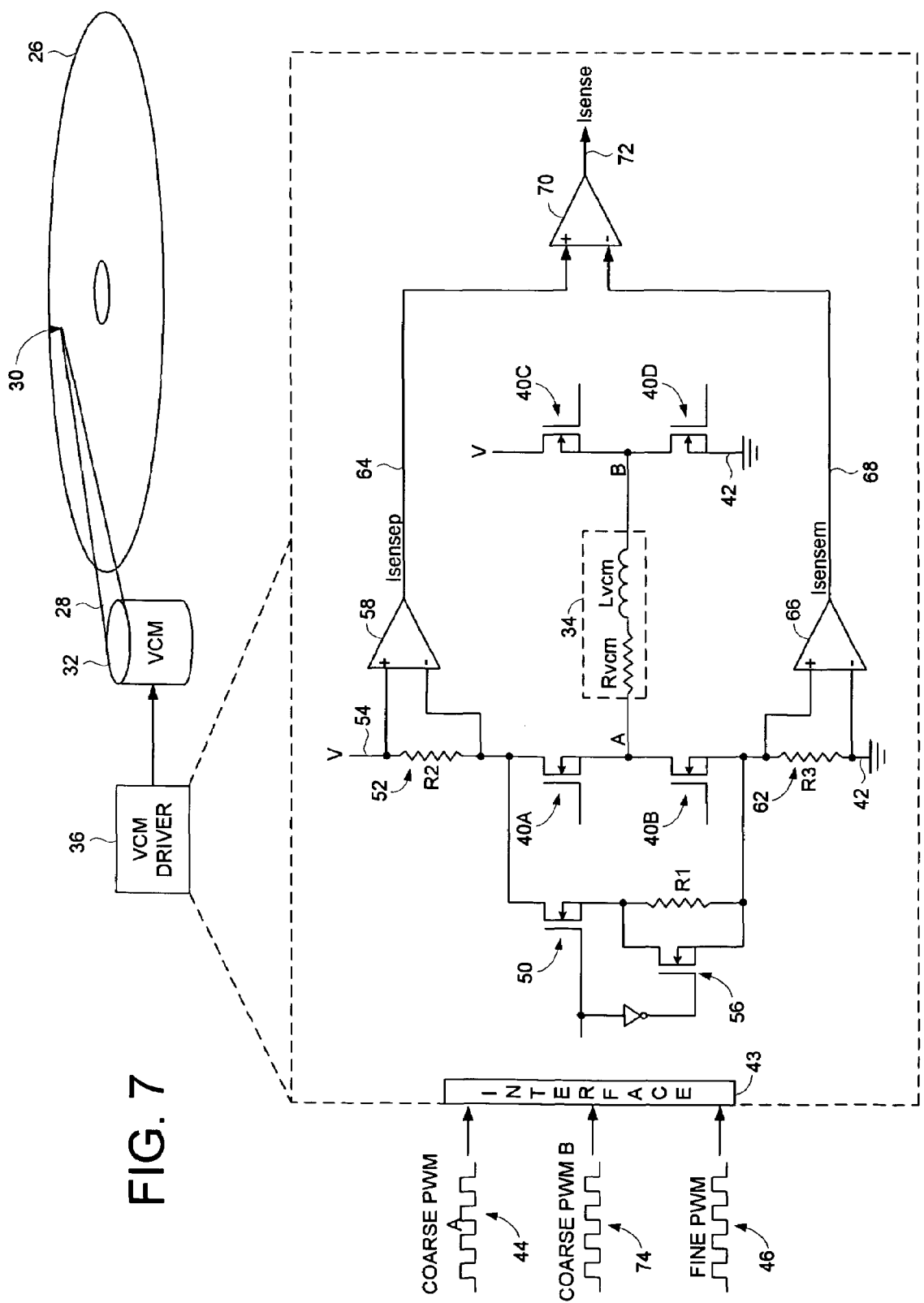

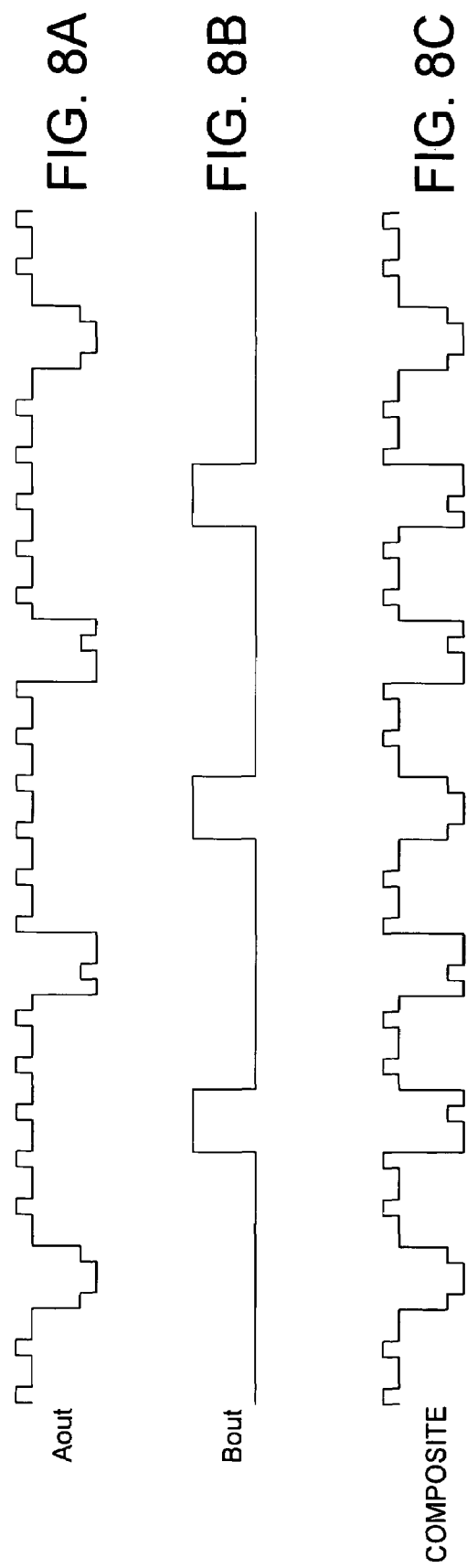

DISK DRIVE EMPLOYING A MULTI-STAGE PULSE WIDTH MODULATED VOICE COIL MOTOR DRIVER

BACKGROUND OF THE INVENTION

1. Field of the Invention

The present invention relates to disk drives for computer systems. More particularly, the present invention relates to a disk drive employing a multi-stage pulse width modulated voice coil motor driver.

2. Description of the Prior Art

FIG. 1 shows a prior art disk drive comprising a disk 2 rotated about a center axis by a spindle motor (not shown). A head 4 attached to a distal end of an actuator arm 6 is actuated radially over the disk 2 by a voice coil motor (VCM) 8. The VCM 8 comprises a voice coil 10 which interacts with permanent magnets of a VCM yoke in order to rotate the actuator arm 6 about a pivot. The VCM 8 is typically driven in either a linear mode or in a pulse width modulated (PWM) mode. In addition, the motion of the VCM 8 may be controlled using a current feedback loop by sensing the amount of current flowing through the voice coil 10 which is proportional to the amount of torque applied to the actuator arm 6.

FIG. 1 also shows a VCM driver 12 comprising a conventional H-bridge driver for driving the voice coil 10 shown as a resistance Rvcm 14 and an inductance Lvcm 16. The H-bridge driver comprises a plurality of driver switches 18A–18D for selectively connecting the ends of the voice coil 10 to a supply voltage 20 or to ground 22 depending on the desired direction of rotation. A PWM signal 24 controls the switches 18A–18D in order to drive current through the voice coil 10 relative to the duty cycle of the PWM signal 24.

Driving the VCM 8 in a PWM mode reduces power dissipation in the driver switches 18A–18D as compared to driving the VCM 8 in a linear mode. However, PWM drivers are slow since an update can be made to the duty cycle only once for each PWM period. If the PWM frequency is increased to compensate for this delay, power dissipation increases due to the rise and fall time of the H-bridge driver, diminishing the benefit of the PWM mode. Additionally, edges of the PWM signal 24 propagate into the VCM wiring, inducing noise in the sensitive read channel circuitry.

There is, therefore, a need to drive a VCM of a disk drive in a PWM mode without requiring high clock speeds while providing adequate closed-loop frequency response.

SUMMARY OF THE INVENTION

The present invention may be regarded as a disk drive comprising a disk, an actuator arm, a head connected to a distal end of the actuator arm, and a voice coil motor (VCM) comprising a voice coil, the VCM for rotating the actuator arm about a pivot to actuate the head radially over the disk. A VCM driver comprises an H-bridge driver having a plurality of driver switches for driving current through the voice coil to ground. The VCM driver further comprises an interface for receiving a first pulse width modulated (PWM) signal for controlling a first voltage level driving the voice coil relative to a duty cycle of the first PWM signal, and a second PWM signal for controlling a second voltage level driving the voice coil relative to a duty cycle of the second PWM signal, wherein the first voltage level is greater than the second voltage level.

In one embodiment, the VCM driver further comprises a first resistor and a first auxiliary switch for diverting current from the voice coil through the first resistor, wherein the first PWM signal controls the driver switches of the H-bridge driver, and the second PWM signal controls the auxiliary switch.

In another embodiment, the VCM driver further comprises a second resistor coupled to the first resistor to form a voltage divider for generating the first voltage level and the second voltage level. The driver switches connect the voice coil to a supply voltage through the second resistor. When the first auxiliary switch is turned off, the first voltage level is applied to the voice coil, and when the first auxiliary switch is turned on, the second voltage level is applied to the voice coil.

In still another embodiment, the H-bridge driver comprises a first leg and a second leg, wherein each leg comprises a first and second driver switches connected in series. The voice coil is connected at a middle node of each leg between the first and second driver switches. The second resistor is connected in series between the supply voltage and the first leg of the H-bridge driver. The first resistor and first auxiliary switch are connected in series. The first resistor and first auxiliary switch are connected in parallel with the driver switches of the first leg of the H-bridge driver.

In yet another embodiment, the VCM driver further comprises a second auxiliary switch connected across the first resistor for discharging the first auxiliary switch when the first auxiliary switch is turned off.

In another embodiment, the VCM driver further comprises an amplifier for amplifying a voltage across the second resistor representing a current flowing through the voice coil, and a sample-and-hold circuit for sampling an output of the amplifier relative to a cycle time of the first and second PWM signals.

In yet another embodiment, the VCM driver further comprises a third resistor connected in series between the first leg of the H-bridge driver and ground. A first amplifier amplifies a voltage across the second resistor to generate a first amplified voltage, and a second amplifier amplifies a voltage across the third resistor to generate a second amplified voltage. A third amplifier amplifies a difference between the first amplified voltage and the second amplified voltage to generate a third amplified voltage representing a current flowing through the voice coil.

In still another embodiment, the VCM driver further comprises a third PWM signal comprising a phase offset from the first PWM signal. The first PWM signal controls the first and second driver switches of the first leg of the H-bridge driver, and the third PWM signal controls the first and second driver switches of the second leg of the H-bridge driver.

In an alternative embodiment, the VCM driver further comprises a second H-bridge driver comprising a plurality of driver switches for driving voltage and current through the voice coil to ground. The first PWM signal controls the first H-bridge driver, and the second PWM signal controls the second H-bridge driver. In one embodiment, the first PWM signal for controlling the first H-bridge driver while seeking the head from a current track to a new track during a seek operation, and the second PWM signal for controlling the second H-bridge driver to maintain the head over the centerline of the target track during a tracking operation.

The present invention may also be regarded as a method of operating a disk drive. The disk drive comprising a disk, an actuator arm, a head connected to a distal end of the actuator arm, and a voice coil motor (VCM) comprising a voice coil, the VCM for rotating the actuator arm about a pivot to actuate the head radially over the disk. A first voltage level is periodically applied to the voice coil using a first pulse width modulated (PWM) signal, and a second voltage level is periodically applied to the voice coil using a second PWM signal, wherein the first voltage level is greater than the second voltage level.

BRIEF DESCRIPTION OF THE DRAWINGS

FIG. 7 shows an embodiment of the present invention wherein the H-bridge driver is driven in a quadrature mode using two coarse PWM signals having a 180 degree phase offset, wherein the first coarse PWM signal drives one leg of the H-bridge driver, the second coarse PWM signal drives the other leg of the H-bridge driver, and the fine PWM signal drives the first and second auxiliary switches.

FIGS. 8A–8C shows the voltage waveforms for the voice coil on each side of the H-bridge driver and the composite voltage waveform of the voltage applied across the voice coil.

DESCRIPTION OF THE PREFERRED EMBODIMENTS

Figure 1:
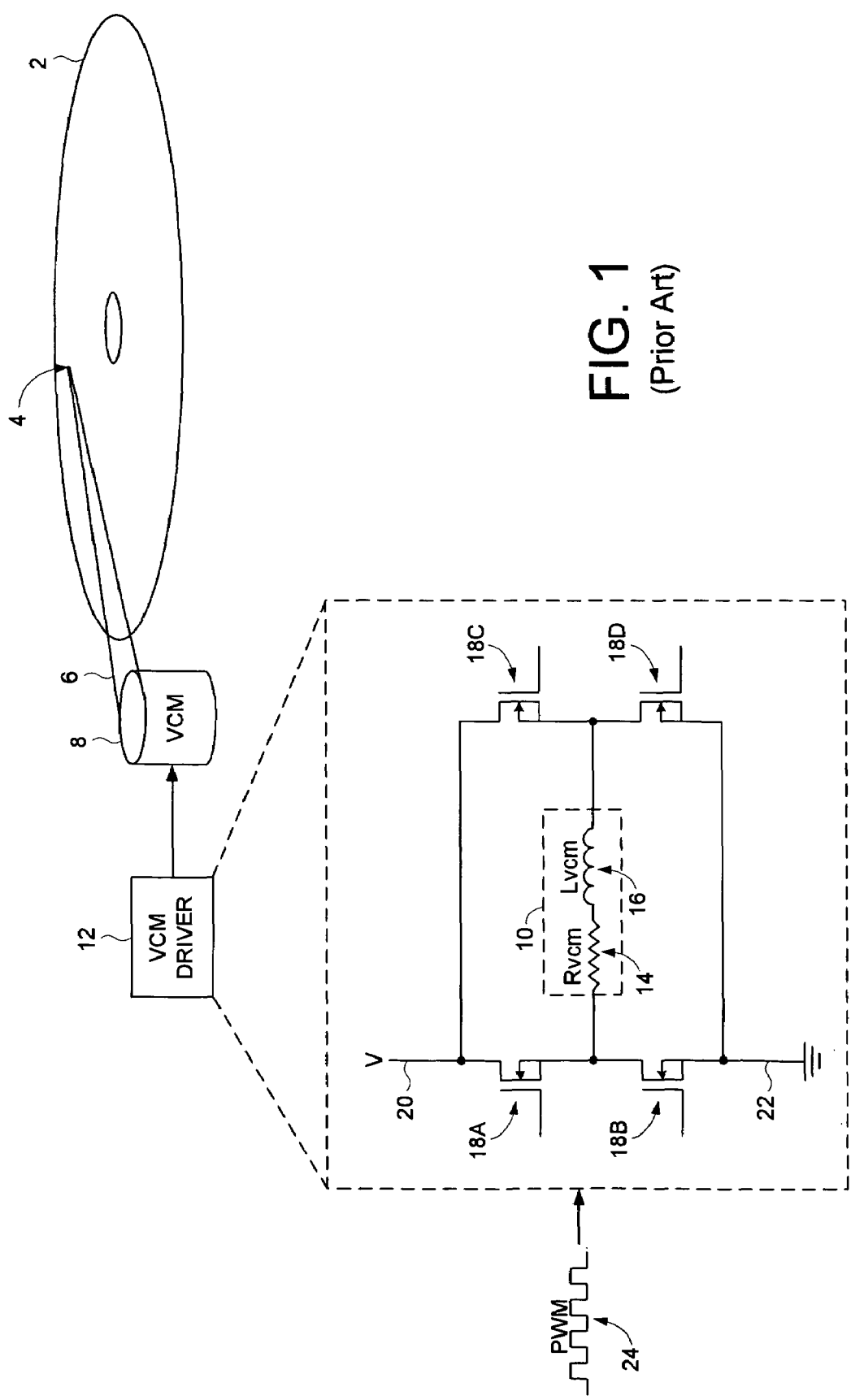
FIG. 1 shows a prior art disk drive comprising a VCM driver employing an H-bridge driver for driving a VCM using a pulse width modulated (PWM) signal.
Figure 2:
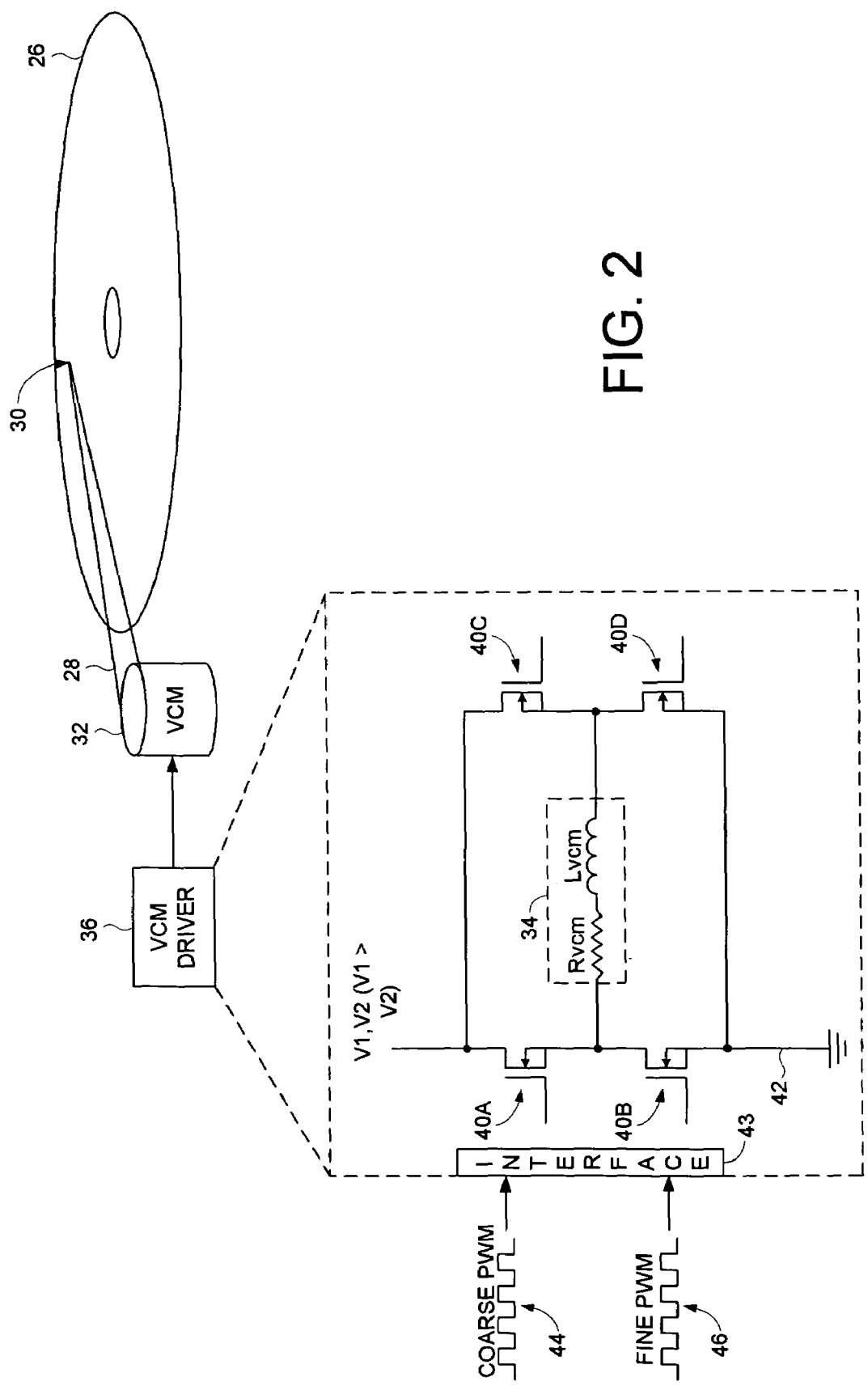
FIG. 2 shows a disk drive according to an embodiment of the present invention comprising a VCM driver employing an H-bridge driver for driving a VCM using a coarse PWM signal and a fine PWM signal.

FIG. 2 shows a disk drive according to an embodiment of the present invention comprising a disk 26, an actuator arm 28, a head 30 connected to a distal end of the actuator arm 28, and a voice coil motor (VCM) 32 comprising a voice coil 34, the VCM 32 for rotating the actuator arm 28 about a pivot to actuate the head 30 radially over the disk 26. A VCM driver 36 comprises an H-bridge driver having a plurality of driver switches 40A–40D for driving current through the voice coil 34 to ground 42. The VCM driver 36 further comprises an interface 43 for receiving a first pulse width modulated (PWM signal 44 for controlling a first voltage level V1 driving the voice coil 34 relative to a duty cycle of the first PWM signal 44, and a second PWM signal 46 for controlling a second voltage level V2 driving the voice coil 34 relative to a duty cycle of the second PWM signal 46, wherein the first voltage level V1 is greater than the second voltage level V2.

Figure 3:
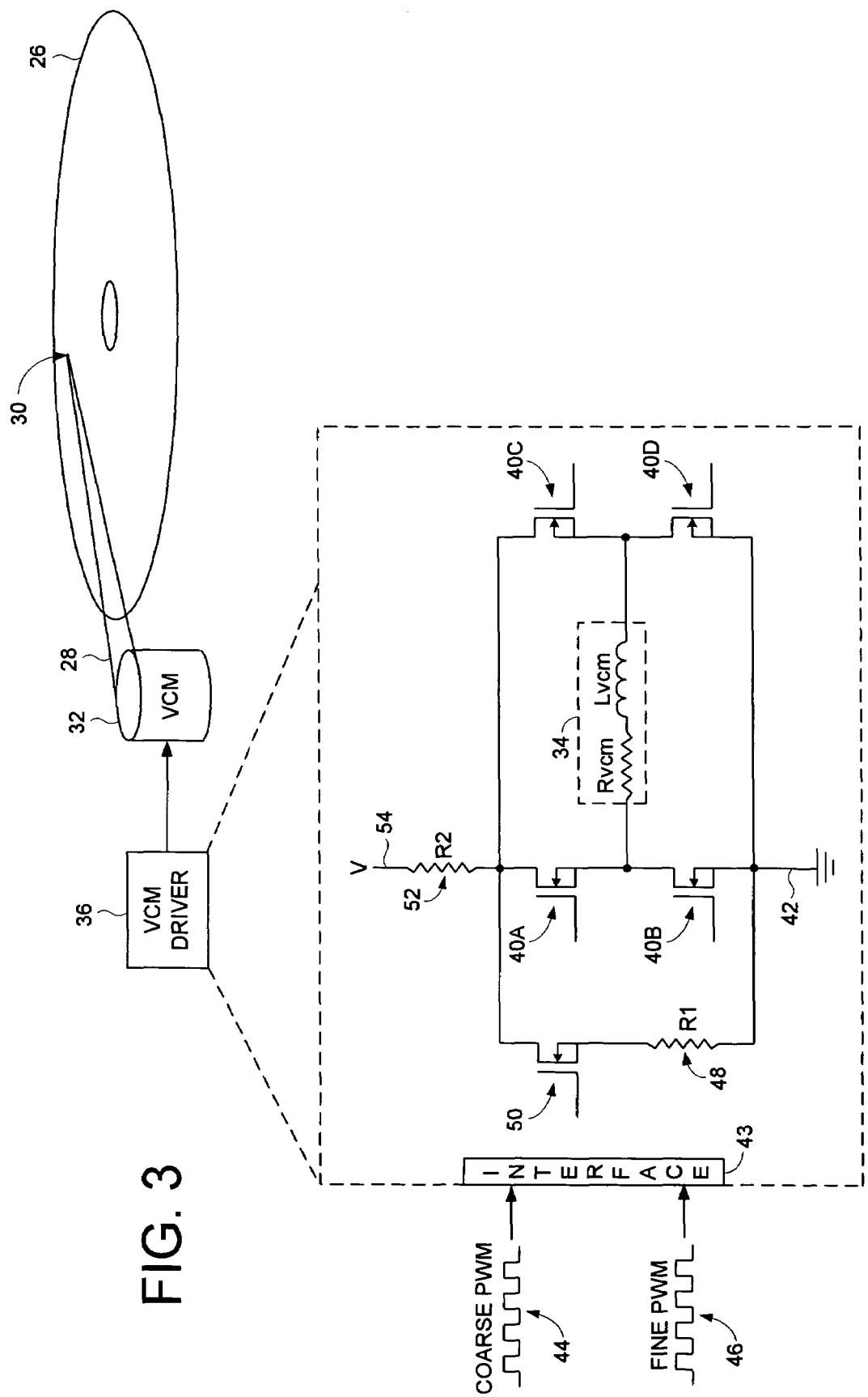
FIG. 3 shows an embodiment of the present invention wherein the VCM driver comprises a first and second resistor implementing a voltage divider and an auxiliary switch for driving the VCM with a first and second voltage level.

In one embodiment shown in FIG. 3, the VCM driver 36 comprises a first resistor 48 and a first auxiliary switch 50 for diverting current from the voice coil 34 through the first resistor 48, wherein the first PWM signal 44 controls the driver switches 40A–40D of the H-bridge driver, and the second PWM signal 46 controls the auxiliary switch 50. A second resistor 52 coupled to the first resistor 48 forms a voltage divider for generating the first voltage level and the second voltage level. The driver switches 40A–40C connect the voice coil 34 to a supply voltage 54 through the second resistor 52. When the first auxiliary switch 50 is turned off, the first voltage level is applied to the voice coil 34, and when the first auxiliary switch 50 is turned on, the second voltage level is applied to the voice coil 34.

In the embodiment of FIG. 3, the H-bridge driver comprises a first leg and a second leg, wherein each leg comprises a first and second driver switches connected in series. Driver switches 40A and 40B are connected in series to form a first leg, and driver switches 40C and 40D are connected in series to form the second leg. The voice coil 34 is connected at a middle node of each leg between the first and second driver switches. The second resistor 52 is connected in series between the supply voltage 54 and the first leg of the H-bridge driver. The first resistor 48 and first auxiliary switch 50 are connected in series. The first resistor 48 and first auxiliary switch 50 are connected in parallel with the driver switches 40A and 40B of the first leg of the H-bridge driver.

The resistor values for the first resistor 48 and the second resistor 52 are selected to obtain the desired ratio between the first and second voltage levels. In one embodiment, the resistors 48 and 52 are selected so that the second voltage level is slightly less than the first voltage level. While it is not essential that the first and second PWM signals 44 and 46 be operated at the same frequency, it is highly desirable because it eliminates secondary effects caused by the switching waveform edges, which add a small amount of modulation to the average voltage across the coil 34. The frequency of the second PWM signal 46 is therefore preferably selected to be equal to the frequency of the first PWM signal 44 (or an integral multiple thereof). The first PWM signal 44 controls the coarse (large voltage step) response of the closed loop servo system and the second PWM signal 46 controls the fine (small voltage step) response of the closed loop servo system. Further, because the difference between the first and second voltage levels is relatively small, the first auxiliary switch 50 dissipates a minimal amount of power and induces a minimal amount of high frequency switching noise into the sensitive read channel circuitry.

Figure 4:
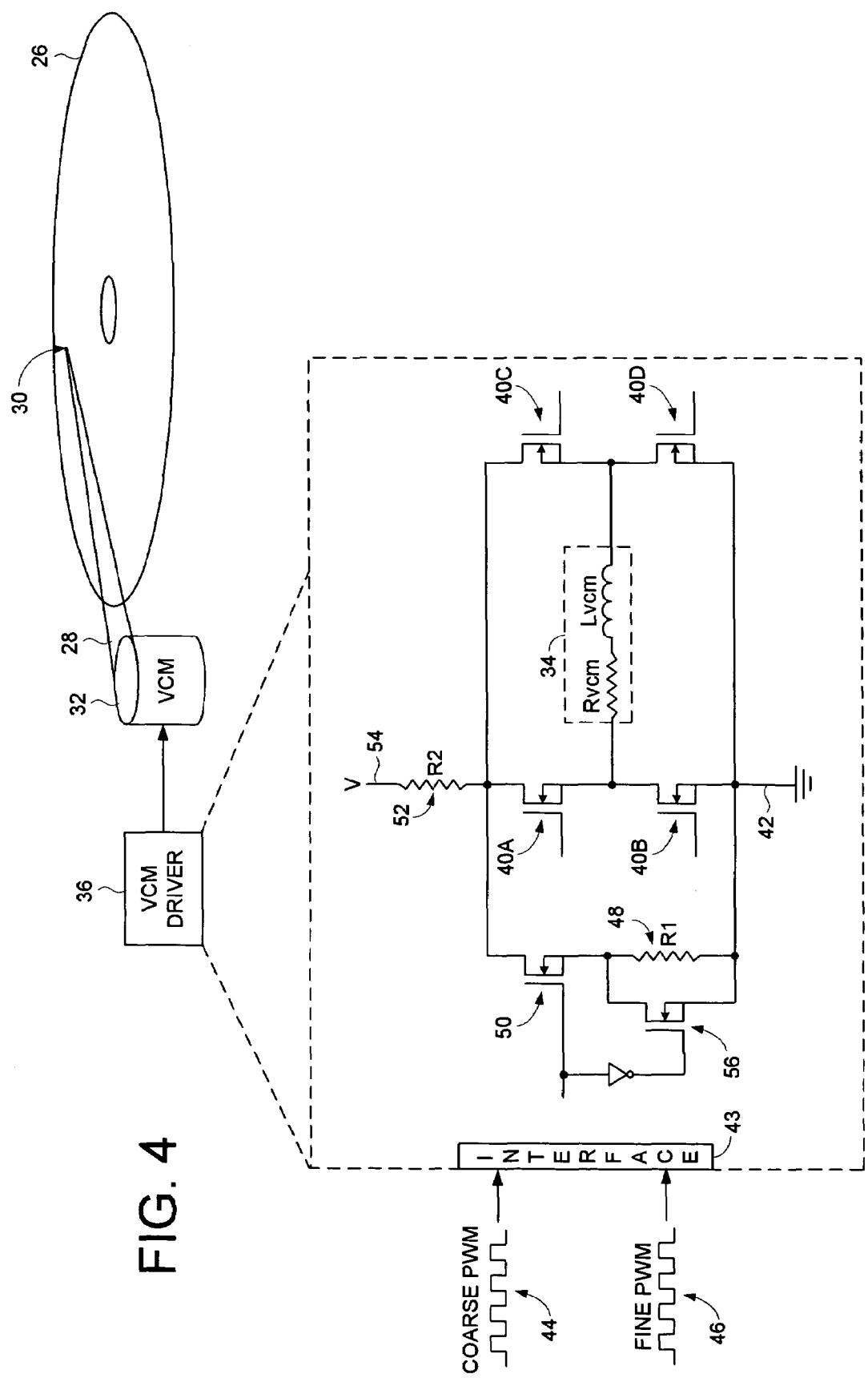
FIG. 4 shows an embodiment of the present invention wherein a second auxiliary switch is employed to discharge the first auxiliary switch when the first auxiliary switch is turned off.

FIG. 4 shows an embodiment of the present invention wherein the VCM driver 36 comprises a second auxiliary switch 56 connected across the first resistor 48 for discharging the first auxiliary switch 50 when the first auxiliary switch 50 is turned off. This improves the rise and fall times to decrease the variation in the output of the H-bridge driver due to the edge of the voltage waveform, which is often load sensitive. In the embodiment of FIG. 4, the non-inverted PWM signal 46 controls the first auxiliary switch 50, and the inverted PWM signal 46 controls the second auxiliary switch 56.

Figure 5:
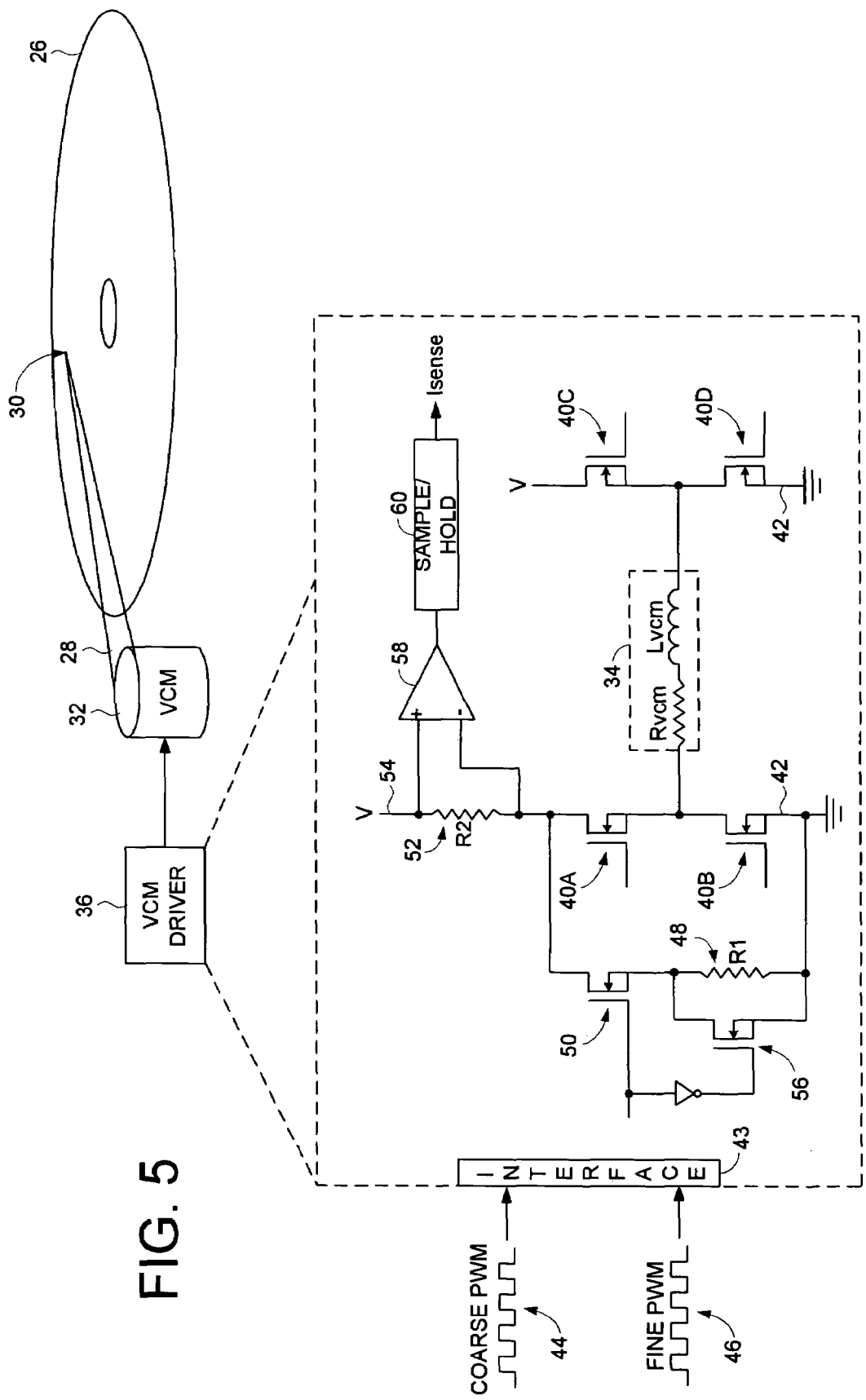
FIG. 5 shows an embodiment of the present invention wherein the second resistor of the voltage divider is used to sense the current flowing through the voice coil of the VCM while the first auxiliary switch is turned off.

FIG. 5 shows an embodiment of the present invention wherein the VCM driver 36 further comprises an amplifier 58 for amplifying a voltage across the second resistor 52 representing a current flowing through the voice coil 34, and a sample-and-hold circuit 60 for sampling an output of the amplifier 58 relative to a cycle time of the first and second PWM signals 44 and 46. The current flowing through the second resistor 52 represents the current flowing through the voice coil 34 when the first PWM signal 44 turns on driver switches 40A and 40D, and the second PWM signal 46 turns off the auxiliary switch 50. The sample-and-hold circuit 60 operates during this part of the PWM cycle (while the second PWM signal 46 turns off the auxiliary switch 50). The current sense signal output by the sample-and-hold circuit 60 is used as feedback in the closed loop servo system to control the motion of the VCM 32.

Figure 6:
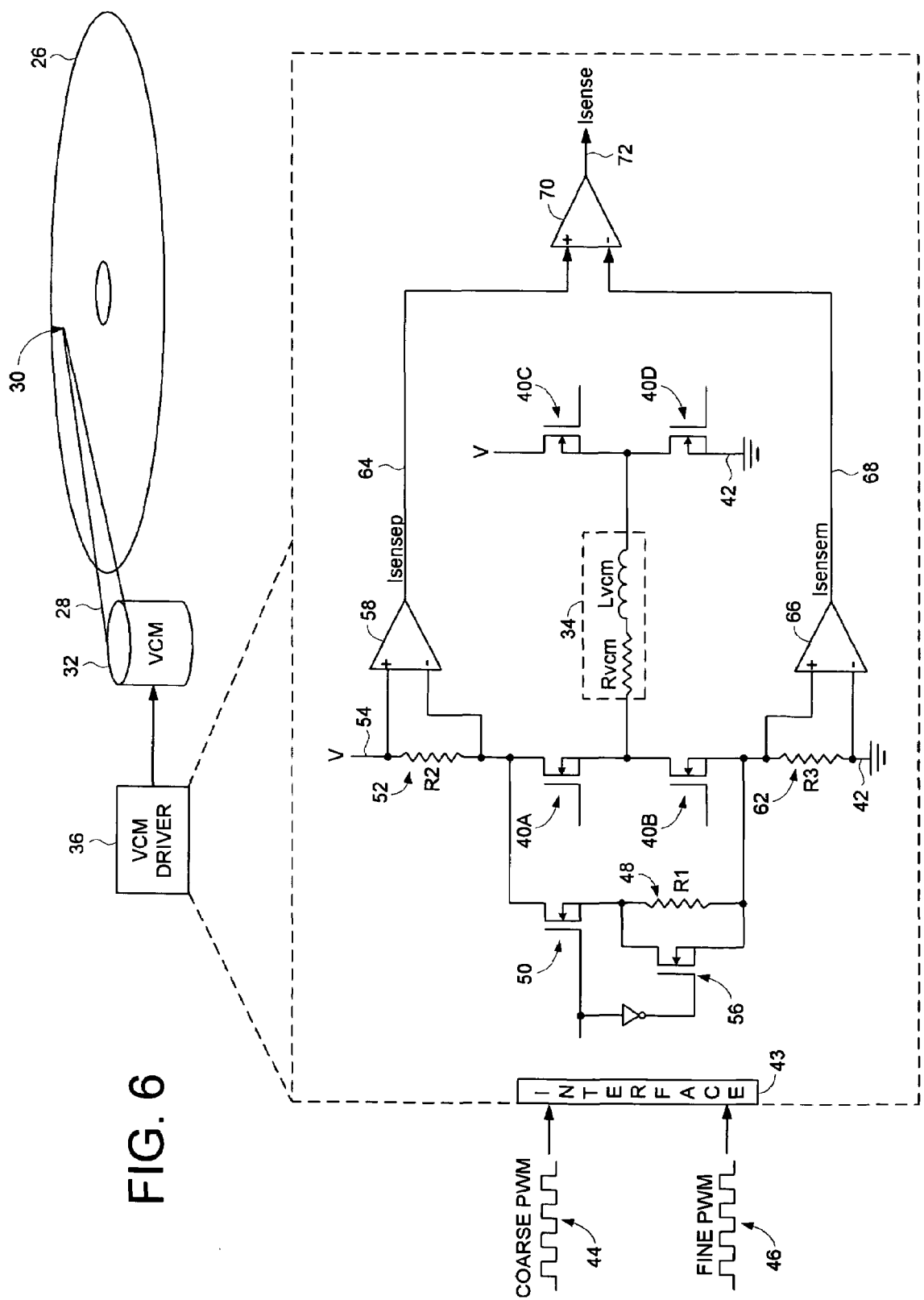
FIG. 6 shows an embodiment of the present invention wherein the second resistor and a third resistor are used to continuously sense the current flowing through the voice coil (when the first auxiliary switch is turned on or off).

FIG. 6 shows an embodiment of the present invention wherein the VCM driver 36 further comprises a third resistor 62 connected in series between the first leg of the H-bridge driver (driver switches 40A and 40B) and ground 42. A first amplifier 58 amplifies a voltage across the second resistor 52 to generate a first amplified voltage 64, and a second amplifier 66 amplifies a voltage across the third resistor 62 to generate a second amplified voltage 68. A third amplifier 70 amplifies the difference between the first amplified voltage 64 and the second amplified voltage 68 to generate a third amplified voltage 72 representing a current flowing through the voice coil 34. When driver switches 40A and 40D are turned on and the second auxiliary switch 50 is turned on, the current flowing through the second resistor 52 equals the current flowing through the voice coil 34 plus the current flowing through the first resistor 48, and the current flowing through the third resistor 62 equals the current flowing through the first resistor 48. Therefore the difference between the first amplified voltage 64 and the second amplified voltage 68 represents the current flowing through the voice coil 34. Similarly, when driver switches 40C and 40B are turned on and the second auxiliary switch 50 is turned on, the current flowing through the third resistor 62 equals the current flowing through the voice coil 34 plus the current flowing through the first resistor 48, and the current flowing through the second resistor 52 equals the current flowing through the first resistor 48. Therefore the difference between the first amplified voltage 64 and the second amplified voltage 68 represents the current flowing through the voice coil 34 regardless of the state of the auxiliary switch 50. This embodiment avoids the cost and timing issues of the sample-and-hold circuit 60 (FIG. 5) as well as reduces the delay time allowing the circuitry to operate at a lower chop frequency saving power. It further eliminates the distortion caused by the sample and hold process, since a sample/hold ignores changes in current during the time the signal is held.

FIG. 7 shows an embodiment of the present invention wherein the VCM driver 36 operates in a quadrature mode. The first PWM signal 44 controls driver switches 40A and 40B of the first leg of the H-bridge driver, and a third PWM signal 74 having a phase offset from the first PWM signal 44 controls the driver switches 40C and 40D of the second leg of the H-bridge driver. In one embodiment, the third PWM signal 74 is the first PWM signal 44 inverted with a 180 degree phase offset from the first PWM signal 44. FIG. 8A shows the voltage waveform of the voltage as measured from node A (FIG. 7) to ground 42, including the fine PWM voltage component of the second PWM signal 46 driving the auxiliary switches 50 and 56. FIG. 8B shows the voltage waveform of the voltage as measured from node B to ground 42. FIG. 8C shows a voltage waveform of the composite voltage as measured across the voice coil 34.

Figure 9A:
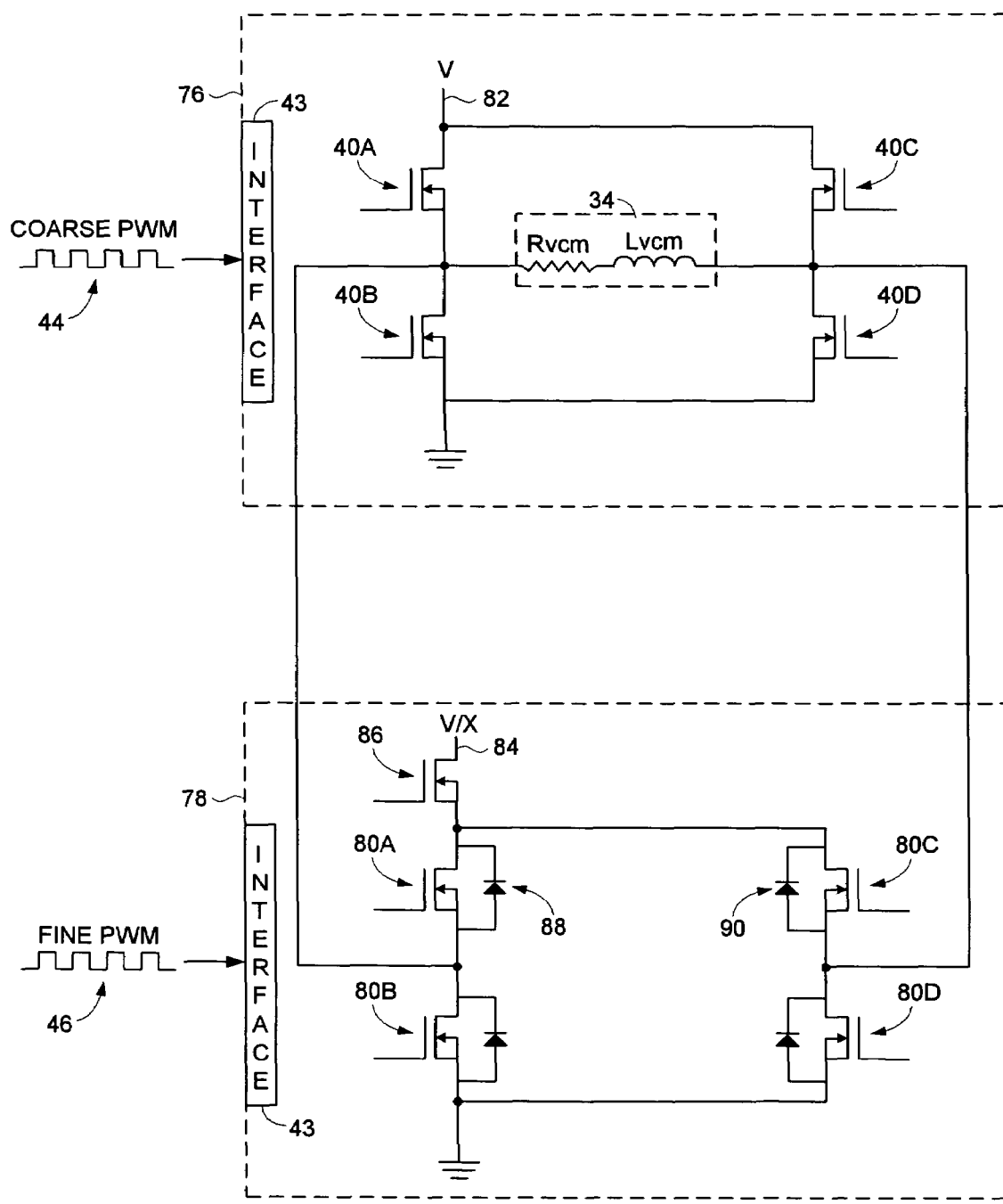
FIG. 9A shows an embodiment of the present invention wherein the VCM driver comprises a first and second H-bridge drivers for driving the voice coil at a first and second voltage level.
Figure 9B:
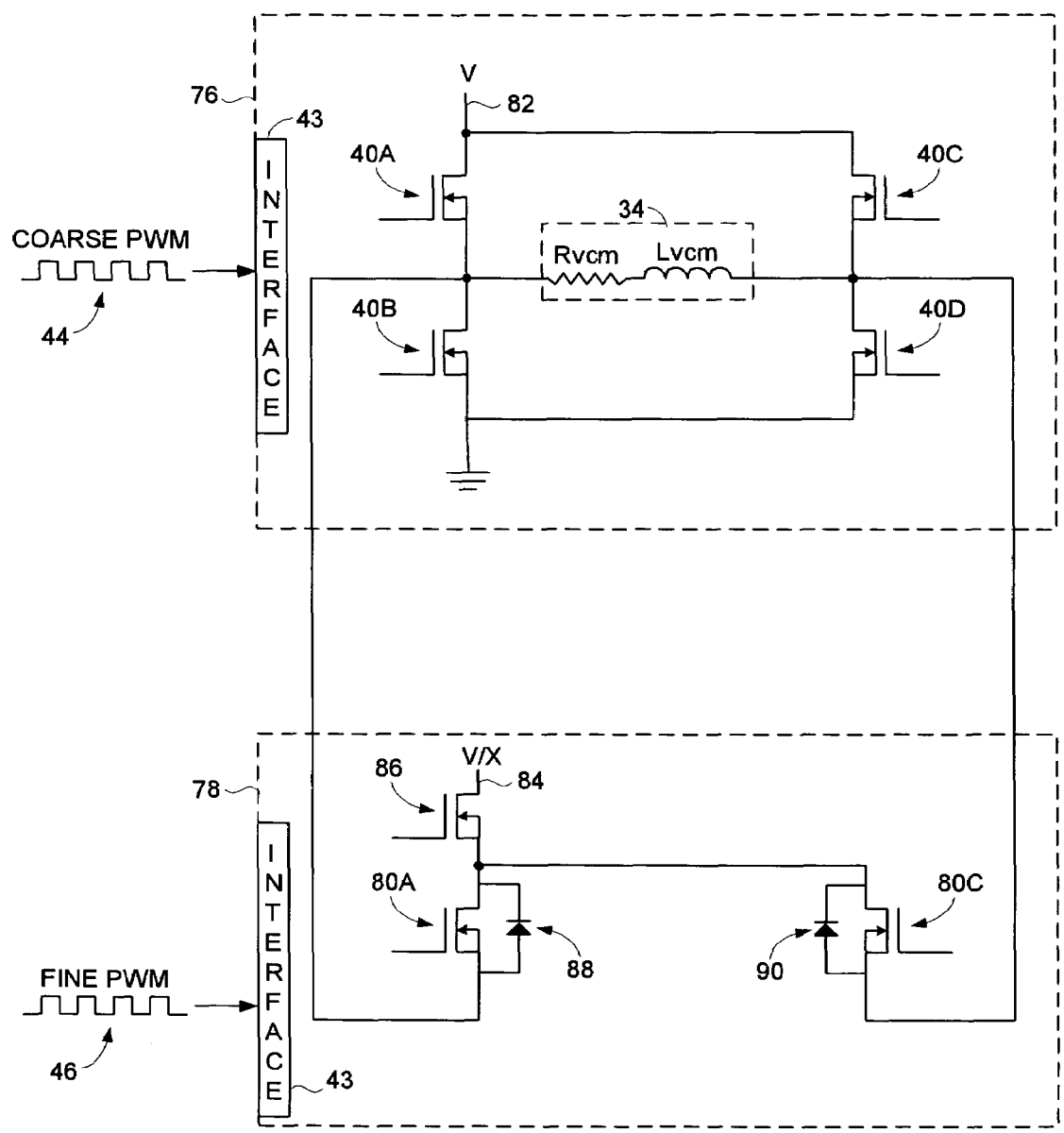
FIG. 9B shows an embodiment of the present invention wherein the first and second H-bridge drivers share the ground-side driver switches.

Any suitable circuitry may be employed for applying a first voltage level to the voice coil 34 using the first PWM signal 44 and a second voltage level to the voice coil 34 using the second PWM signal 46. FIG. 9A shows an embodiment of the present invention wherein the VCM driver 36 comprises a first H-bridge driver 76 having a plurality of driver switches 40A–40D, and a second H-bridge driver 78 having a plurality of driver switches 80A–80D for driving current through the voice coil 34 to ground. The first PWM signal 44 controls the first H-bridge driver 76, and the second PWM signal 46 controls the second H-bridge driver 78. The first H-bridge driver 76 applies a first voltage level 82 (V) to the voice coil 34, and the second H-bridge driver 78 applies a smaller voltage level 84 (V/X where X is greater than 1) to the voice coil 34. Protection switch 86 isolates the second H-bridge driver 78 from the first H-bridge driver 76 whenever the first H-bridge driver 76 is enabled to prevent the voltage sources 82 and 84 from shorting through diodes 88 and 90. FIG. 9B shows an alternative embodiment wherein the first and second H-bridge drivers 76 and 78 share the ground-side driver switches 40B and 40D.

In one embodiment, the first PWM signal 44 controls the first H-bridge driver 76 to apply the first voltage level 82 (V) to the voice coil 34 during a seek operation while seeking the head 30 from a current track to a new track. Using a higher voltage level (e.g., 12 v) reduces the seek time by applying a greater torque to the actuator arm 28. When the head 30 arrives at the target track, the second PWM signal 46 controls the second H-bridge driver 78 to apply the second lower voltage level 84 (V/X) to the voice coil 34 in order to maintain the head 30 over the centerline of the target track during a tracking operation. Applying a lower voltage level (e.g., 1.2 v) to the voice coil 34 improves the tracking performance as compared to applying the higher voltage level (e.g., 12 v) because the effective change in current for a given change in timing is smaller, resulting in increased resolution. In one embodiment, the higher voltage level (e.g., 12 v) is used to drive the spindle motor (not shown) for rotating the disk 26, and the lower voltage level (e.g., 1.2 v) is used to drive the logic circuitry of the disk drive.

Figure 10:
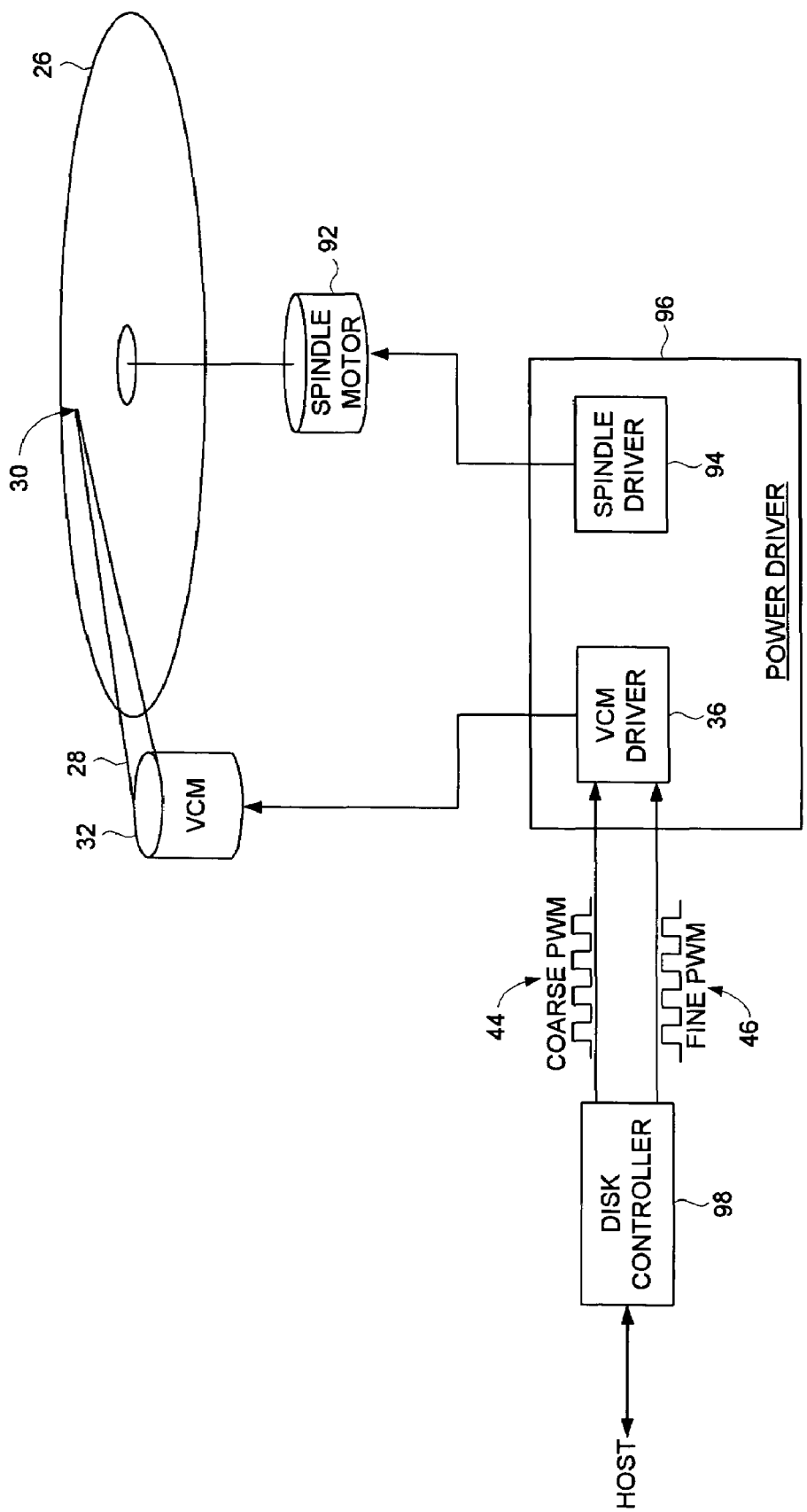
FIG. 10 shows an embodiment of the present invention wherein the VCM driver and spindle driver are integrated into a power driver integrated circuit (IC), and the first and second PWM signals are generated by disk controller IC.

FIG. 10 shows a disk drive according to an embodiment of the present invention including a spindle motor 92 for rotating the disk 26 and a spindle driver 94 for controlling the spindle motor 92. The spindle driver 94 and the VCM driver 36 are integrated into a power driver integrated circuit (IC) 96. A disk controller IC 98 interfaces with a host computer and generates the first and second PWM signals 44 and 46 applied to the VCM driver 36.

I claim:
1. A disk drive comprising:
  (a) a disk;
  (b) an actuator arm;
  (c) a head connected to a distal end of the actuator arm;
  (d) a voice coil motor (VCM) comprising a voice coil, the VCM for rotating the actuator arm about a pivot to actuate the head radially over the disk; and
  (e) a VCM driver comprising:
    a first pulse width modulated (PWM) H-bridge driver comprising a plurality of driver switches for driving current through the voice coil to ground;

an interface for receiving:
a first PWM signal for controlling a first voltage level applied across the voice coil relative to a duty cycle of the first PWM signal; and
a second PWM signal for controlling a second voltage level applied across the voice coil relative to a duty cycle of the second PWM signal, wherein the first voltage level is greater than the second voltage level.

2. The disk drive as recited in claim 1, wherein the VCM driver further comprises:
(a) a first resistor; and
(b) a first auxiliary switch for diverting current from the voice coil through the first resistor, wherein the first PWM signal controls the driver switches of the first H-bridge driver, and the second PWM signal controls the auxiliary switch.

3. The disk drive as recited in claim 2, wherein the VCM driver further comprises a second resistor coupled to the first resistor to form a voltage divider for generating the first and second voltage levels, wherein:
(a) the driver switches connect the voice coil to a supply voltage through the second resistor;
(b) when the first auxiliary switch is turned off, the first voltage level is applied to the voice coil; and
(c) when the first auxiliary switch is turned on, the second voltage is applied to the voice coil.

4. The disk drive as recited in claim 3, wherein:
(a) the first H-bridge driver comprises a first leg and a second leg, wherein each leg comprises a first and second driver switches connected in series;
(b) the voice coil is connected at a middle node of each leg between the first and second driver switches;
(c) the second resistor is connected in series between the supply voltage and the first leg of the first H-bridge driver;
(d) the first resistor and first auxiliary switch are connected in series; and
(e) the first resistor and first auxiliary switch are connected in parallel with the driver switches of the first leg of the first H-bridge driver.

5. The disk drive as recited in claim 2, wherein the VCM driver further comprises a second auxiliary switch connected across the first resistor for discharging the first auxiliary switch when the first auxiliary switch is turned off.

6. The disk drive as recited in claim 3, wherein the VCM driver further comprises:
(a) an amplifier for sensing a voltage across the second resistor representing a current flowing through the voice coil; and
(b) a sample-and-hold circuit for sampling an output of the amplifier relative to a cycle time of the first and second PWM signals.

7. The disk drive as recited in claim 4, wherein the VCM driver further comprises:
(a) a third resistor connected in series between the first leg of the first H-bridge driver and ground;
(b) a first amplifier for amplifying a voltage across the second resistor to generate a first amplified voltage;
(c) a second amplifier for amplifying a voltage across the third resistor to generate a second amplified voltage; and
(d) a third amplifier for amplifying a difference between the first amplified voltage and the second amplified voltage to generate a third amplified voltage representing a current flowing through the voice coil.

8. The disk drive as recited in claim 4, wherein:
(a) the VCM driver further comprises a third PWM signal comprising a phase offset from the first PWM signal;
(b) the first PWM signal controls the first and second driver switches of the first leg of the first H-bridge driver; and
(c) the third PWM signal controls the first and second driver switches of the second leg of the first H-bridge driver.

9. The disk drive as recited in claim 1, wherein the VCM driver further comprises a second H-bridge driver comprising a plurality of driver switches for driving voltage and current through the voice coil to ground, wherein:
(a) the first PWM signal for controlling the first H-bridge driver; and
(b) the second PWM signal for controlling the second H-bridge driver.

10. The disk drive as recited in claim 9, wherein:
(a) the first PWM signal for controlling the first H-bridge driver while seeking the head from a current track to a new track during a seek operation; and
(b) the second PWM signal for controlling the second H-bridge driver to maintain the head over the centerline of the target track during a tracking operation.

11. A method of operating a disk drive, the disk drive comprising a disk, an actuator arm, a head connected to a distal end of the actuator arm, a voice coil motor (VCM) comprising a voice coil, and a pulse width modulated (PWM) H-bridge driver comprising a plurality of driver switches for driving current through the voice coil to ground, the VCM for rotating the actuator arm about a pivot to actuate the head radially over the disk, the method comprising the steps of:
(a) controlling the PWM H-bridge driver to periodically apply a first voltage level across the voice coil using a first PWM signal; and
(b) controlling the PWM H-bridge driver to periodically apply a second voltage level across the voice coil using a second PWM signal, wherein the first voltage level is greater than the second voltage level.

12. The method as recited in claim 11, wherein the second PWM signal for diverting current from the voice coil through a first resistor.

13. The method as recited in claim 12, wherein the first voltage level and the second voltage level are generated by a voltage divider circuit comprising the first resistor connected in series with a second resistor.

14. The method as recited in claim 13, further comprising the step of sensing a voltage across the second resistor representing a current flowing through the voice coil.

15. The method as recited in claim 13, wherein the voltage divider circuit further comprises a third resistor connected in series with the first and second resistors, further comprising the steps of:
(a) amplifying a voltage across the second resistor to generate a first amplified voltage;
(b) amplifying a voltage across the third resistor to generate a second amplified voltage; and
(c) generating a difference between the first amplified voltage and the second amplified voltage to generate a third amplified voltage representing a current flowing through the voice coil.

* * * * *